(12) United States Patent
Byde et al.

(10) Patent No.: US 8,086,520 B2
(45) Date of Patent: Dec. 27, 2011

(54) CONSTRAINT SATISFACTION FOR SOLUTIONS TO AN AUCTION WINNER-DETERMINATION PROBLEM

(75) Inventors: Andrew Byde, Cardiff (GB); Terence Kelly, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1067 days.

(21) Appl. No.: 11/546,042

(22) Filed: Oct. 11, 2006

(65) Prior Publication Data

US 2008/0114661 A1    May 15, 2008

(51) Int. Cl.
*G06Q 40/00* (2006.01)
(52) U.S. Cl. .......................... 705/37; 705/35; 705/36 R
(58) Field of Classification Search .................. 705/37, 705/14.71, 14
See application file for complete search history.

(56) References Cited

U.S. PATENT DOCUMENTS

| | | | |
|---|---|---|---|
| 6,952,682 B1* | 10/2005 | Wellman | 705/37 |
| 7,305,363 B1* | 12/2007 | Sandholm et al. | 705/37 |
| 7,801,769 B1* | 9/2010 | Kelly et al. | 705/26 |
| 2002/0065762 A1* | 5/2002 | Lee et al. | 705/37 |
| 2002/0152182 A1* | 10/2002 | Kashima et al. | 705/80 |
| 2003/0033236 A1* | 2/2003 | Davenport et al. | 705/37 |
| 2003/0225677 A1* | 12/2003 | Sandholm et al. | 705/37 |
| 2004/0024686 A1* | 2/2004 | Sandholm et al. | 705/37 |
| 2006/0020394 A1* | 1/2006 | Dicke et al. | 702/19 |
| 2007/0008927 A1* | 1/2007 | Herz et al. | 370/331 |
| 2007/0087756 A1* | 4/2007 | Hoffberg | 455/450 |
| 2007/0156575 A1* | 7/2007 | Sandholm et al. | 705/37 |
| 2008/0063141 A1 | 3/2008 | Luan et al. | |
| 2008/0103852 A1* | 5/2008 | Byde | 705/7 |

OTHER PUBLICATIONS

Martin Bichler, Jayant Kalagnanam; "Configurable offers and winner determination in multi-attribute auctions", IBM T.J. Watson Research Center, Available online Feb. 21, 2004.*
Noam Nisan, Amir Ronen; "Algorithmic Mechanism Design", Game and Economic Behavior, vol. 35, pp. 166-196, Published 2001.*
Eugene L. Lawler, "A Procedure for Computing the K Best Solutions to Discrete Optimization Problems and Its Application to the Shortest Path Problem" Management Science, vol. 18, No. 7, Theory Series (Mar. 1972), pp. 401-405.*
"Combinatorial Auctions", Edited by Peter Cramton, Yoav Shoham and Richard Steinberg, MIT Press, Published Jan. 2006, Chapter 12.*
Anderegg et al., "Ad hoc-VCG: A Truthful and Cost-Efficient Routing Protocol for Mobile Ad hoc Networks with Selfish Agents", MobiCom'03, Sep. 14-19, 2003.*
Chang Wook Ahn et al., "A Genetic Algorithm for Shortest Path Routing Problem and the Sizing of Populations" IEEE Transactions on Evolutionary Computation, vol. 6, No. 6, Dec. 2002.*
"Combinatorial Auctions", Jan. 2006, Mit Press, Chapters 12, 13, 14 and 23.*
Ahuja, R. et al., "Network Flows", 1993, p. 106-107, Prentice Hall, Upper Saddle River, NJ.
Andersson, A. et al., "Integer Programming for Combinatorial Auction Winner Determination", Computing Science Dept. Information Technology, Uppsala Univ. downloaded Sep. 22, 2005.
Bender, E. et al., "Foundations of Applied Combinatorics", 1991, p. 31-33, Addision-Wesley Publishing Company.

(Continued)

*Primary Examiner* — Charles Kyle
*Assistant Examiner* — Ryan D. Donlon

(57) ABSTRACT

A set of solutions satisfying a constraint for an auction winner-determination problem are computed by generating a graph of paths, wherein each path represents a solution to the auction winner-determination problem that satisfies the constraint.

16 Claims, 9 Drawing Sheets

OTHER PUBLICATIONS

Eppstein, D., "Finding the k Shortest Paths", Mar. 1997, Dept. of Information and Computer Science, Univ. of CA, Irvine, CA.

Feller, W., "An Introduction to Probability Theory and Its Applications", 1970, p. 38-39, vol. 1, John Wiley & Sons, Third Edition.

Hadjiconstantinou, E. et al., "An Efficient Implementation of an Algorithm for Finding K Shortest Simple Paths", Networks, 1999, vol. 34, Iss. 2, Abstract only.

Kellerer, H. et al., "Knapsack Problems", 2004, p. 1-5, 20-26, Springer.

Kelly, T., "Generalized Knapsack Solvers for Multi-Unit Combinatorial Auctions: Analysis and Application to Computational Resource Allocation", Feb. 2004, HP Laboratories.

Kelly, T. et al., "Relaxation Criteria for Iterated Traffic Simulations", 1998, vol. 9, International Journal of Modern Physics C, World Scientific Publishing Company.

Kelly T., "Utility-Directed Allocation", Jun. 2003, HPL-2003-115, HP Laboratories Palo Alto.

Perko, A., "Implementation of Algorithms for K Shortest Loopless Paths", Networks, 1986, p. 149-160. vol. 16, John Wiley & Sons.

* cited by examiner

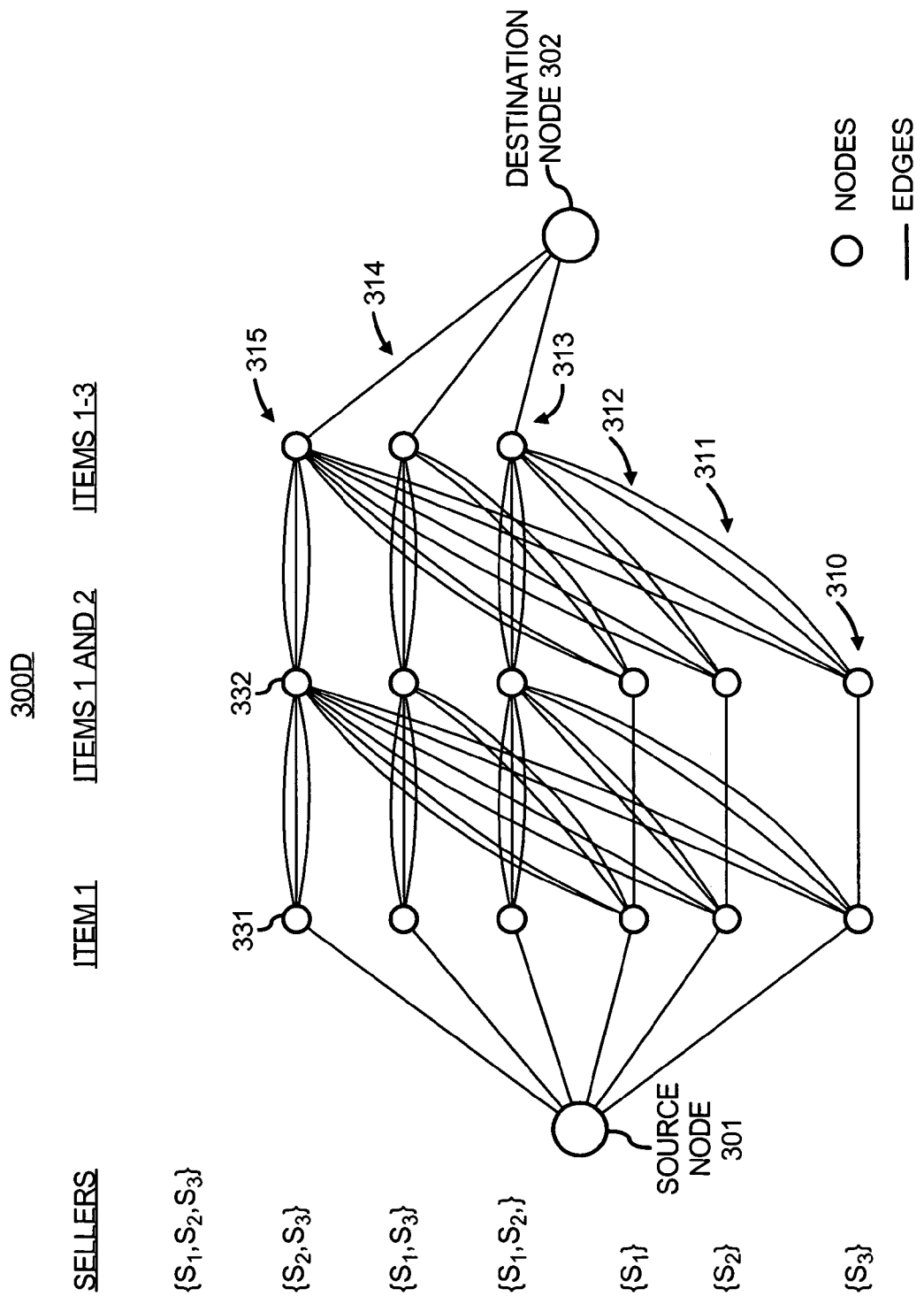

CONSTRAINT SATISFACTION FOR SOLUTIONS TO AN AUCTION WINNER-DETERMINATION PROBLEM

BACKGROUND

Auctions traditionally include the sale of goods from a seller to a buyer. A typical auction includes multiple buyers bidding on a good, referred to as a forward auction. Another type of common auction is a reverse auction or procurement auction, in which multiple sellers compete to sell goods to a single buyer. For example, a procurement auction may include a buyer that needs several lots of several different goods. The buyer receives bids from many sellers for supplying at least a portion of the needed goods at a particular price. Often, the buyer will expend a significant amount of resources, including time, money and other resources, to select a cheapest combination of winning bids to supply all the needed lots of all the goods. Furthermore, a buyer in a procurement auction may have constraints on selecting winning bids. For example, a buyer may want to purchase a certain number of lots from a particular seller or a buyer may want to set a limit on the number of lots that can be purchased from any given seller. Given a large number of bids and constraints, the process of selecting winning bids becomes even more difficult.

BRIEF DESCRIPTION OF THE DRAWINGS

Embodiments are illustrated by way of example and not limitation in the accompanying figures in which like numeral references refer to like elements, and wherein:

FIGS. 3A-D show examples of graphs including paths representing solutions to an auction winner determination problem, according to an embodiment;

DETAILED DESCRIPTION

Figure 1:
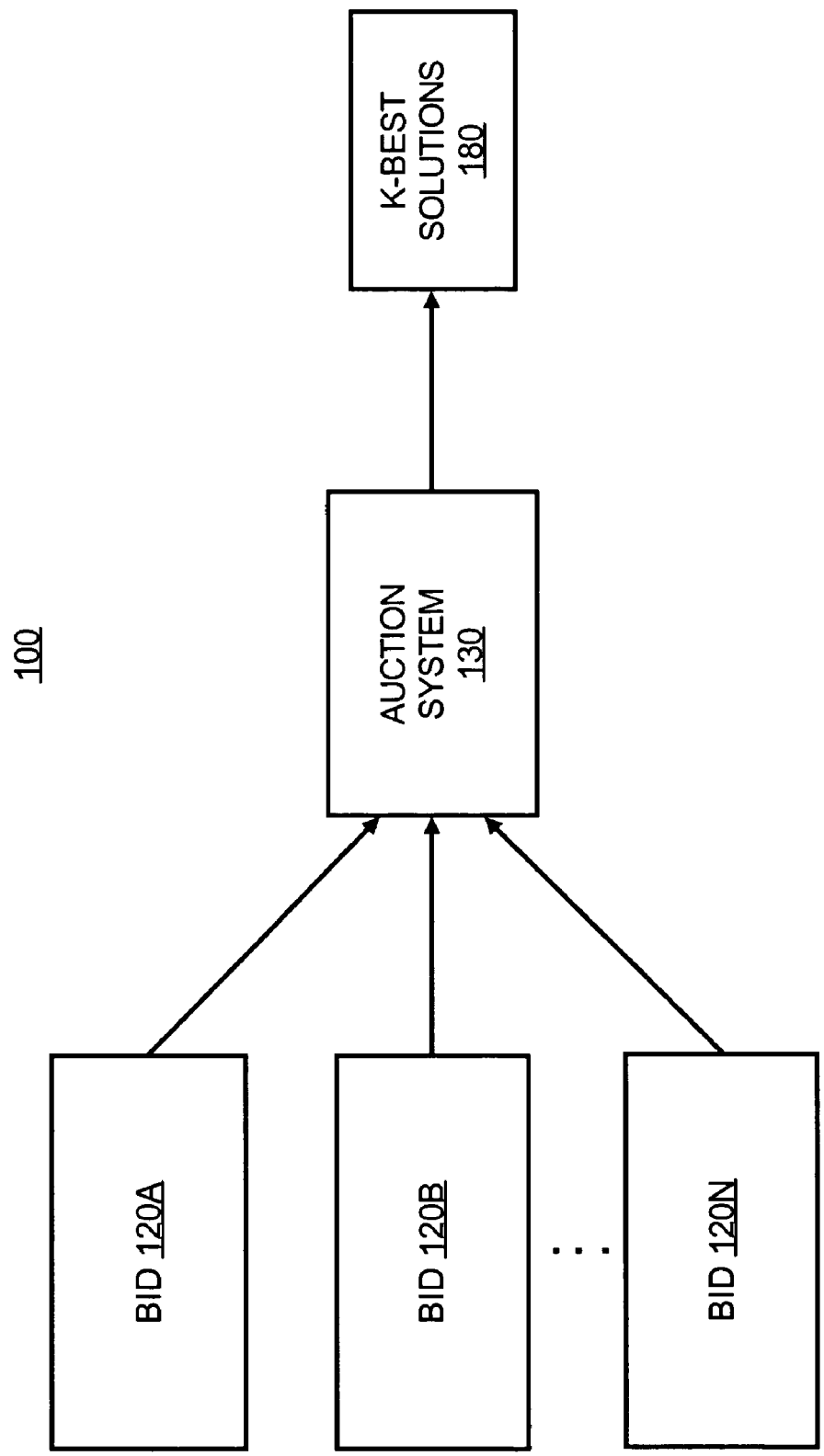
FIG. 1 shows a system for determining K-best solutions to an auction winner determination problem, according to an embodiment.

For simplicity and illustrative purposes, the principles of the embodiments are described. However, one of ordinary skill in the art would readily recognize that the same principles are equally applicable to, and can be implemented with variations. Moreover, in the following detailed description, references are made to the accompanying figures, which illustrate specific embodiments.

Several terms are used to describe the different embodiments. For clarity, a glossary of the terms and their corresponding definitions are provided below.

An auction is a means whereby agents exchange goods according to systematic rules of interaction. Different types of auctions are described below.

Examples of goods include the following: material things, such as, building materials or computer components; services, such as a contract to provide janitorial services for a stated period of time; agreements, such as agreements to enter into business relationships; financial instruments, such as stocks or bonds; any other entity that may be owned or traded; undesirable things, such as chemical waste that one must dispose of, or onerous responsibilities that one might prefer others to assume.

An agent is a participant in an auction. Examples of agents are individual persons, firms, governments, or any other entity that owns and exchanges goods and services and enters into agreements. An agent in an auction, for example, is a buyer, a seller, or both. Computer systems and/or person(s) performing decision-making tasks may be the agents.

An agent's bid is its input to an auction. In one instance, a bid is expressed as an amount of money that the agent is willing to pay or the amount that the agent demands to be paid for each outcome that is possible in the auction. For example, an agent demands to be paid $2 per quart to properly dispose of someone else's used motor oil. A bid, for example, specifies a set of mutually exclusive outcomes, each with an associated willingness to pay. In such cases it is understood that at most one of these outcomes will occur. "Selecting a subset of winning bids" refers to selecting, at most, one of the mutually exclusive outcomes in each agent's bid. For example, a broker agent who possesses four pork bellies at the outset of an auction submits a bid that expresses a willingness to sell three of these, and also a willingness to purchase seven additional pork bellies, but not a willingness to buy or sell any other quantity. Such a bid is encoded as a set of (quantity, price) pairs, in which each (quantity, price) pair expresses the price the agent is willing to pay to obtain the corresponding quantity of pork bellies. Negative prices indicate demand or amount to be paid, and negative quantities indicate sales rather than acquisitions. For example, the bid "$\{(-3, \$-5), (7, \$9)\}$" may indicate that the agent demands $5 in exchange for three of its pork bellies, and is willing to pay $9 to acquire seven additional pork bellies. Auction rules may require that an additional "(0, $0)" pair be implicitly present in every bid, indicating that the agent will neither buy nor sell any goods, in which case the agent will neither gain nor lose money.

Seller bids in a procurement auction may express volume discounts and/or volume surcharges. Volume discounts charge less per unit for larger purchases and volume surcharges charge more per unit for larger purchases. For example, the bid "$\{(-5, \$-5), (-10, \$-9), (-15, \$-20)\}$" offers a volume discount for purchasing 10 units instead of 5 but imposes a volume surcharge for purchasing 15 units instead of 10 or 5. The quantity-price bid pairs are shown as negative amounts because negative prices indicate, for example, amount to be paid, and negative quantities indicate sales rather than acquisitions. Other protocols may be used to express bids.

Auction rules determine the outcome of an auction based on submitted bids and possibly other information, such as global constraints. The winner determination problem (WDP) of an auction, referred to as the auction WDP, is the computational problem of applying the auction rules to given input bids and determining a final disposition of goods.

A solution to the auction WDP may include a subset of submitted bids, such as in the case of a procurement auction, or a single bid, such as in the case of an auction where a seller is receiving bids, each bid including a purchase price for a good being sold by the seller. If the auction WDP is formulated as a mathematical programming problem, a solution may be an assignment of values to the decision variables. A solution to the auction WDP may also specify or entail additional information, such as monetary payments among agents. The auction WDP may be expressed as an optimization problem in which one seeks to optimize an objective function.

An objective function is a function that associates a scalar number with every solution to the auction WDP. For example, our objective function may be the total monetary gains that accrue to all agents as a result of changing the ownership of goods through the auction. The objective function is to maximize the gains in this example. In another example, the objective function in a procurement auction is to minimize the buyer's total expenditure.

Constraints restrict the solutions to an auction WDP.

Particular types of constraints are described below.

A fundamental constraint is a constraint that follows from "mass conservation" and similar principles. For example, it is a fundamental constraint that no agent may purchase at an auction more units of a good than are offered for sale at that auction.

A global constraint is a constraint that is not fundamental but that is imposed nonetheless. For example, a buyer in a procurement auction may require that at least two and at most four sellers supply goods, even though solutions exist in which fewer than two or more than four sellers satisfy the buyer's demand. Also, global constraints may be applied to more than one item in a procurement auction.

A soft constraint is a global constraint that an agent may be willing to relax. For example, the buyer in a procurement auction may wish to acquire goods from at most four sellers, but may be willing to allow five sellers to supply goods if substantial savings would result.

A linear constraint is a constraint that can be expressed as a linear inequality in a mathematical optimization problem corresponding to the auction WDP. For example, the constraint that no seller in a procurement auction may supply more than 30% of an item is a linear constraint.

A constraint that does not come within the metes and bounds of the definition of a linear constraint is a non-linear constraint. For example, a natural business requirement such as "seller A's share of item 1 among all sellers of item 1 located in the same geographic area, should be no less than his share of item 2 among the sellers of item 2 from the same region" can be expressed only as a nonlinear constraint on the allocations.

There may be some overlap in the types of constraints. For example, a global constraint may be soft, linear, non-linear or a combination of different types of constraints.

Several categories of solutions to an auction WDP may exist, with reference to the objective function and the above types of constraints:

A relaxed solution is a solution to the auction WDP ignoring global constraints, and satisfying only fundamental constraints. The relaxed K-best solutions, for example, are a "K" number of solutions that best satisfy an objective function.

A feasible solution satisfies all constraints that are present, both fundamental constraints and global constraints.

An optimal solution is a solution that is optimized for the objective function of the auction WDP. For example, the objective function is to lower the buyer's costs, and the optimal solution is a solution that requires the buyer to pay the least amount for desired goods when compared to other possible solutions. It should be noted that an optimal relaxed solution may not necessarily be inferior to an optimal feasible solution and in some instances may be superior to an optimal feasible solution.

For purposes of describing the embodiments, a sealed-bid auction is one type of auction where each agent submits a bid. An auction algorithm then computes a solution to the auction WDP that determines a final disposition of goods, such as a final disposition in which agents are awarded possession of the goods and possibly also monetary transfers among the agents. In a sealed-bid auction, agents do not observe one another's bids, and the overall procedure is executed only once, and thus the overall procedure does not iterate. An example of an auction that is not a sealed-bid auction is an English open-outcry auction, in which a crier announces a price and then raises the price as bidders accept the current price. In the English open-outcry auction, agents learn the bids of other agents, and the process of reaching a final outcome involves iteration of a basic cycle of announce price/accept price.

A procurement or reverse auction is an auction in which a single buyer seeks to acquire goods from several sellers. For example, the buyer wishes to acquire specific quantities of each of several items, wherein an item is a type of a good. For example, the items are computer CPUs and computer cooling fans, and the buyer wishes to acquire 10,000 CPUs and 8,000 cooling fans. The buyer is furthermore willing to acquire units of any one item from more than one seller. For example, the buyer is willing to acquire 2,500 CPUs from one seller and 7,500 CPUs from another seller.

The buyer in a procurement auction may restrict the number of possible ways in which its overall demand is satisfied by insisting that any one seller provide a fraction $0/Q$, $1/Q$, $2/Q$, etc., of the buyer's total demand for each item, where Q is a positive integer. For example, if Q=4, the buyer insists that any given seller sells exactly 0%, 25%, 50%, 75%, or 100% of the buyer's total demand. $1/Q$ is referred to as one quantile. For example, if Q=2, the buyer wishes to acquire two quantiles of the item.

For purposes of illustration, an example of a procurement auction is described in which a buyer wishes to acquire Q quantiles of each of several items. In the context of this instance of a procurement auction, the following definitions apply:

A solution to the auction WDP is an assignment of non-negative quantiles of each item to each seller, for instance, "for item X, seller A will supply zero quantiles, B will supply two quantiles, and C will supply five quantiles."

An acceptable solution is a solution in which, for each item, the sum over all sellers of assigned quantiles is exactly Q, which means that the buyer acquires exactly Q quantiles of each item in an acceptable solution.

The definitions of relaxed solution, feasible solution, and optimal solution remain unchanged in the case of a procurement auction. In addition, a solution can be a feasible solution, such that the solution satisfies all given fundamental and global constraints, without being an acceptable solution.

According to an embodiment, a solution to an auction winner determination problem (WDP) for a multi-item procurement auction, whereby sellers bid to supply shares of each item, is determined by generating a graph, such as a directed acyclic graph, including paths that correspond to solutions to the auction WDP and that satisfy any global constraints on the auction WDP. Firstly, an assignment list of all the individual-item sub-auction solutions is determined. For example, for each item, a list of assignments of item shares to sellers is generated such that the buyer acquires exactly Q quantiles of each item, where Q quantiles is the desired amount of the item that the buyer wants to acquire through the auction. Item shares may be expressed in terms of non-negative quantiles for each item to each seller. The sum of shares over all the sellers for each item is exactly Q quantiles for each item. Secondly, a graph is formed from the assignment list. The graph is comprised of paths between a source node and a destination node. Each path represents a solution to the auction WDP that satisfies one or more global constraints.

Having constructed the graph, a K-shortest path algorithm may be used for extracting a list of K-shortest paths through the graph from the source node to the destination node. The K-shortest paths may be ordered based on an objective, such as monetary costs to a buyer. For example, the costliest solutions are listed last and the cheapest solutions are listed first.

Knapsack problems correspond to dynamic programming problems and, consequently, dynamic programming methods are operable to be used to solve knapsack problems. According to an embodiment, the auction WDP is formulated as a knapsack problem and the knapsack problem is formulated as a dynamic programming problem. The dynamic programming problem is then converted into a shortest paths problem. Then, a KSP algorithm is applied to the shortest paths problem to determine K-shortest paths in the graph that correspond to the K-best solutions to the auction WDP. Thus, the problem of computing K-best solutions to an auction WDP is converted to a problem of computing K-shortest paths in a particular graph.

A knapsack problem is any one of a large class of knapsack problems that formalize situations in which, given a set of objects, it is desired to select an optimal subset of the objects. In one example of a knapsack problem, each object has an associated "weight" and "profit", and a container is filled with a subset of objects whose sum of profits is greatest, subject to the constraint that the sum of object weights does not exceed the weight capacity of the container.

Many knapsack problems correspond to dynamic programming problems and, consequently, dynamic programming methods are operable to be used to solve knapsack problems. Dynamic programming involves solving a problem by decomposing the problem into smaller problems and solving the smaller problems optimally. An optimal solution to the overall problem consists of optimal solutions to the smaller constituent problems. For example, a fastest path between New York and Los Angeles on an Interstate highway system may pass through Oklahoma City. If so, the fastest path from New York to Los Angeles consists of the fastest path from New York to Oklahoma City followed by the fastest path from Oklahoma City to Los Angeles. For any dynamic programming problem there exists a corresponding shortest paths problem whose solution yields a solution to the dynamic programming problem.

A shortest paths problem is one of several problems of computing a shortest, or longest, path in a directed or undirected graph. In one embodiment, in a shortest paths problem, a directed or undirected graph and designated source and destination nodes are given. For example, a path is computed, which is defined as a sequence of edges, that connects the source node with the destination node and whose length, which is defined as the sum of constituent edge lengths or edge weights, is shortest or longest. As illustrated by the example in the previous paragraph, many types of shortest paths problems may be solved by dynamic programming.

A K-shortest paths (KSP) problem is one type of a shortest-paths problem. In a KSP problem, the shortest path between a source node and a destination node is computed. Also, the second shortest, third shortest, etc., up to some given number K of desired paths are computed. In other types of KSP problems, paths are generated in ascending order of length until path length exceeds a specified threshold. In still other types of KSP problems, as many paths as possible are generated, until, for example, the computational resources that are available are exhausted.

Referring to FIG. 1, a system 100 is shown for receiving a plurality of bids 120, such as bids 120A-120N, in an auction, according to an embodiment. The system 100 includes an auction system 130 operable to receive the bids 120 and to process the bids 120 to determine a set of K-best solutions 180 to an auction WDP. Each of the bids 120 represents an agent's input to an auction. In one instance, each of the bids 120 is expressed as an amount of money that the agent is willing to pay or the amount the agent demands to be paid for a number of shares for an item.

A selected bid is one or more of the bids 120 that satisfies a request to obtain or sell one or more goods at an auction. A request is a request for bids, such as a request for offers to purchase one or more goods, or a request for offers to sell one or more goods, such as a particular amount of one or more item types, at the auction. For example, a buyer in a procurement auction requests bids from sellers for goods the buyer wants to purchase.

The K-best solutions 180 is a "K" number of solutions. Examples of solutions operable to be generated by the auction system 130 include feasible solutions, optimal solutions and acceptable solutions. In one embodiment, the K-best solutions 180 include only feasible solutions, which are solutions that satisfy fundamental constraints and at least one global constraint. The feasible solutions may also be optimal solutions that best satisfy an objective, such as the K-cheapest solutions. One of the solutions may be selected as the winning solution, and the number of shares for each item is acquired from each seller as expressed in the share item/seller assignments for the winning solution.

In one example, a procurement auction or a reverse auction is initiated by a request from a single buyer to purchase multiple items. The multiple items include, for example, multiple item types where a particular number of items of each item type is being purchased. The request from the single buyer evokes bids from multiple sellers. For instance, during a procurement auction, a buyer submits a request. For example, the auction system 130 receives a request from a buyer for purchasing items at an auction.

In response to the buyer's request, each of a plurality of sellers submits a bid 120A, 120B . . . 120N to satisfy the buyer's request. For example, the auction system 130 transmits the request to a plurality of sellers known to provide the desired goods, and the auctions system 130 receives the bids 120 from the sellers for the goods. The buyer clears the procurement auction by selecting one or a subset of the bids 120A, 120B . . . 120N that satisfies the buyer's request, also referred to as an acceptable solution. In some examples, one or a subset of the bids 120A, 120B . . . 120N encode volume discounts or volume surcharges.

The auction system 130 is operable to determine the K-best solutions 180 for other types of auctions as well. For example, a forward auction includes interaction of a single seller with multiple buyers. In a forward auction, a bid includes an offer from a buyer to purchase one or more items at an auction. In another example, a bid includes one or more offers from one or more sellers to sell one or more items at an auction. In another example, a bid includes an offer from a buyer to purchase a plurality of items at an auction, or an offer from a seller to sell a plurality of items at an auction. One of ordinary skill in the art will recognize that agents also interact in other types of auctions, including for example a two-sided combinatorial exchange, a sealed-bid multi-unit combinatorial auction, or any other type of format or setting in which goods are exchanged between agents.

Figure 2:
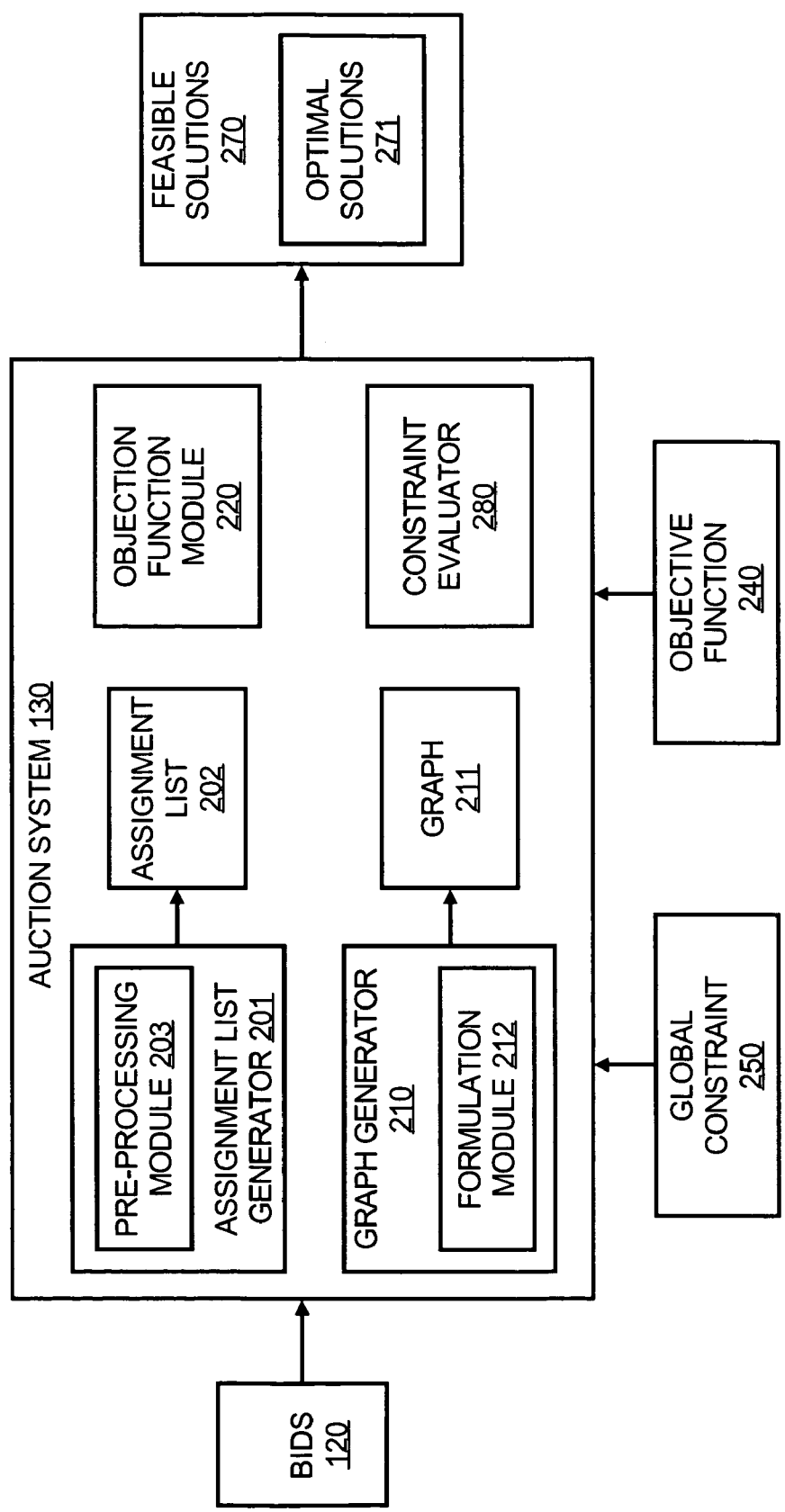
FIG. 2 shows a detailed block diagram of an auction system, according to an embodiment.

Referring to FIG. 2, a more detailed depiction of the auction system 130 is shown. The bids 120 correspond to the plurality of bids 120A, 120B . . . 120N shown in FIG. 1.

The auction system 130 includes an assignment list generator 201 operable to generate an assignment list 202. The assignment list 202 is a list of all the relaxed solutions, which are solutions to the auction WDP ignoring global constraints and satisfying only fundamental constraints. For a multi-item procurement auction, the assignment list 202, for example, is all the individual-item sub-auction solutions, and the assignment list 202 may be expressed in terms of item shares to sellers and item shares may be expressed in quantiles. Also, cost for each solution may be calculated and provided in the assignment list 202.

The assignment list 202 may be comprised of individual-item sub-auction solutions. An individual-item sub-auction solution is a relaxed solution for acquiring the desired amount of one particular item in a multi-item procurement auction. The assignment list generator 201 may use a known recursive algorithm to generate a set of individual-item sub-auction solutions for each of a plurality of individual-item sub-auctions.

In one embodiment, the number of individual-item sub-auction solutions for the assignment list 202 is determined by how many ways Q quantiles can be supplied by S sellers. In each individual-item sub-auction, each of the sellers supplies between zero and Q quantiles of the item requested. The number of ways in which exactly Q quantiles can be supplied by S sellers is given by the following Equation 1:

$$R(S,Q)=(Q+S-1)!/[Q! \times (S-1)!]$$

For many situations, the number of ways in which exactly Q quantiles can be supplied by S sellers can be exhaustively enumerated. For example, if Q=10 quantiles, and S=12 sellers, then R(12, 10)=352,716. Equation 1 is used to provide the R(S,Q) number of acceptable solutions to an individual-item sub-auction, i.e., the number of solutions that supply exactly Q quantiles. The assignment list generator 202 may use known recursive algorithms to enumerate all the individual-item sub-auction solutions that supply exactly Q quantiles for each item for generating the assignment list 202.

An example of a portion of the assignment list 202 is shown in table 1 below. Assume there are three sellers S1-S3 and the buyer desires to purchase three items X-Z. The bids 120 may include quantiles and prices for one or more of the items. For example, Q=3 for each of the items X-Z.

TABLE 1

| Item X | Item Y | Item Z |
|---|---|---|
| {S1, (−3, −7)}; | {S3, (−3, −12)}; | {S2, (−3, −7)}; |
| Σp = −7 | Σp = −12 | Σp = −7 |
| {S1, (−1, $−2)}, | {S1, (−1, $−4)}; | {S1, (−2, $−8)}, |
| {S3, (−2, $−4)}; | S2, (−1, $−4)}, | {S3, (−1, $−2)}; |
| Σp = −6 | {S3, (−1, $−6)}; | Σp = −10 |
|  | Σp = −14 |  |
| . . . | . . . | . . . |

Table 1 shows a partial list of individual-item sub-auction solutions in the assignment list 202. All combinations of the bids 120 providing individual-item sub-auction solutions may be listed in the assignment list 202. The first entry for item X includes {S1, (−3,−7)}; Σp=−7. This represents that one individual-item sub-auction solution for the item X determined from the bids 120 includes the seller S1 providing all the desired quantiles, which is 3 in this example at a cost of 7. The second entry for item X shows an individual-item sub-auction solution where the seller S1 provides 1 quantile and the seller S2 provides 2 quantiles and the total cost for that solution is 6. Examples of entries for items Y and Z are also shown.

As shown above, the assignment list 202 may keep track of the particular sellers, quantiles for each seller, and price for each individual-item sub-auction solution.

According to one embodiment, the assignment list generator 202 includes a pre-processing module 203. The pre-processing module 203 performs pre-processing by eliminating at least one of the individual-item sub-auction solutions to diversify the set of feasible solutions 270, which include the K-best solutions 180. For example, the K-best solutions 180, in certain instances, are substantially similar and there are minor differences between each of the K-best solutions 180. By eliminating certain individual-item sub-auction solutions, the K-best solutions 180 are diversified.

The graph generator 210 generates a graph 211 from the assignment list 202. The graph 211 includes paths between a source node and a destination node. Each path represents a feasible solution to the WDP that satisfies the global constraint 250. Each path is comprised of nodes and edges. Each edge may represent an individual-item sub-auction solution. A metric value for a metric associated with the global constraint 250 is calculated for each node.

One example of a metric is number of sellers. For example, the global constraint 250 is that no more than 2 different sellers may be used to supply all the needed items in a multi-item procurement auction. The graph generator 210 calculates a metric value of number of sellers for each node. The metric value may be incremented, decremented or left the same at each node, depending on the number of sellers for each node. For example, an unordered list of the identity of each seller so far included is maintained. A metric value is calculated, for example, by determining the number of different sellers in the list. If the metric value exceeds two for a node, an edge is not provided to that node. Otherwise an edge is provided to the node, which represents an individual-item sub-auction solution. The metric value need not be a numeric value. For example, the metric value may be the unordered list of the identities of the sellers so far included. The total number of identities of different sellers is then determined from the list and compared to the constraint. Alternatively, the metric value is the total number of identities of different sellers calculated from the list. Also, it will be apparent to one of ordinary skill in the art that metrics and constraints not related to the number of sellers may be used.

The generalization of this process includes decomposition of the evaluation of the global constraint 250 into metric value calculations at each node. The evaluation of the global constraint 250 thus becomes a chain of evaluations of the metric values over a sequence of individual-item sub-auction solutions, and the subsequent construction of the graph 211 on the basis of this chain of evaluations. Thus, the graph 211 is constructed to include feasible solutions that satisfy the global constraint 250. Solutions that do not satisfy the global constraint 250 are not included in the graph 211. Other examples of metrics that may be associated with various global constraints include but are not limited to number of quantiles for each seller and cost. Also, the graph 211 may be a directed acyclic graph. Examples of the graph 211 and constructing the graph 211 are described with respect to FIGS. 3A-D.

The objective function module 220 may use a known K-shortest path algorithm for extracting a list of K-shortest paths from the graph 211. The K-shortest paths may be ordered based on an objective function 240 and represent the K-best solutions 180. For example, if the objective function 240 is cheapest monetary cost, the objective function module 220 extracts the K-cheapest solutions from the graph and may order the K-cheapest solutions from cheapest to most expensive. Other objective functions may alternatively be applied.

In one embodiment, the graph generator 210 includes a formulation module 212. The formulation module 220 performs several functions including, for instance, formulating the auction WDP as a knapsack problem, formulating the knapsack problem as a dynamic programming problem, and formulating the dynamic programming problem as a KSP problem.

Formulation involves an application or execution of at least one process that results in an expression of a problem, such as the mathematical expression of a KSP problem. The mathematical expression may be solved by one or more processes, such as application of a known KSP algorithm by the objective function module 220. For example, the objective function module 220 solves the KSP problem using a known KSP algorithm to determine the K-best solutions 180.

Formulation is operable to be performed manually and/or is operable to be automated. For example, mapping tables are used by the formulation module 212 to map an auction WDP to a corresponding knapsack problem. Examples of corresponding knapsack problems are shown below in table 2. In one example, the mapping tables are populated with values calculated manually using techniques known in the art.

Table 2 below lists examples of three types of auctions and a corresponding type of knapsack problem that is operable to be formulated for each type of auction WDP. The auction WDP for each of the auctions is operable to be expressed as the type of knapsack problem shown in the last column, for example, by the formulation module 220.

TABLE 2

| Auction Type | Knapsack Problem (KP) |
|---|---|
| Single-Good-Type Multi-Unit Double Auction, single-quantity bids | 0-1 KP |
| Single-Good-Type, Multi-Unit Double Auction, fully-expressive bids | Multiple-Choice KP (MCKP) |
| Multi-Unit Combinatorial Auction (multi-item procurement auction; fully-expressive bids) | Multi-Dimensional Multiple-Choice KP (MDMCKP) |

The double auction with single quantity bids, the double auction with unrestricted (fully expressive) bids, and the multi-unit combinatorial auction are examples of three types of auctions. A "fully expressive" bid is one that defines the agent's willingness to pay (or demand to be paid) for each possible outcome of the auction. For example, if there are exactly five units of a good available for sale at an auction, a fully expressive bid defines an agent's willingness to pay for zero units, one unit, two units, three units, four units, or five units. A single-quantity bid, by contrast, defines the agent's willingness to pay for only a single quantity, e.g., three units. 0-1 KP, MCKP, and MDMCKP are known types of knapsack problems. Table 2 shows that the auction WDP for a double auction with single-quantity bids is operable to be expressed as a 0-1 KP. The auction WDP for a double auction, fully-expressive bids is operable to be expressed as a MCKP, and the auction WDP for a multi-unit combinatorial auction is operable to be expressed as a MDMCKP.

The formulation module 212 formulates the knapsack problem as a dynamic programming problem. For example, the formulation module 212 expresses the knapsack problem using well known Bellman equations. Other known processes and algorithms can be used to express the knapsack problem as a dynamic programming problem. In another example, a mapping table, for example, populated manually, is used by the formulation module 212 to formulate the dynamic programming problem from the knapsack problem.

In addition, the formulation module 212 converts the dynamic programming problem into a KSP problem. Converting, for example, includes transforming the dynamic programming problem into a KSP problem such that a solution to the KSP problem is also a solution to the dynamic programming problem.

The feasible solutions 270 may include all of the solutions corresponding to the paths in the graph 211, such as if the objective function module 220 did not apply the objective function 240 to the graph 211. The K-best solutions 180 include the optimal solutions 271, where the objective function module 220 applies the objective function 240 to the graph 211 for determining the K-best solutions that best satisfy the objective function 240. The number of solutions K may be predetermined.

The auction system 130 may select one of the K-best solutions as the winning solution to be used for procuring the desired amount of each item. For example, the cheapest solution is selected. Also, the auctions system 130 may present the K-best solutions 180 to a decision maker, such as a procurement executive. The K-best solutions 180 may be presented as a graph or list of solutions that may be ordered based on the objective function 240. The decision maker may then select one of the K-best solutions 180 as the winning solution. For example, the cheapest solution or one of the cheapest solutions may be selected. The decision maker may apply soft constraints when selecting the winning solution depending on the cost. For example, if the decision maker prefers to purchase from seller S1, then the decision maker may select the solution where the most amount of items are acquired from the seller S1. However, if the cost of selecting that solution greatly exceeds another solution, a different solution may be selected.

As described above, the solutions represented by the paths in the graph 211, which also includes the K-best solutions 180 are solutions that satisfy the global constraint 250. The global constraint 250 may include one global constraint or multiple global constraints. If multiple global constraints are applied, then the solutions to the auction WDP in the graph 211 may satisfy all the global constraints.

As described above, the graph 211 is determined by calculating a metric value associated with the global constraint 250 for each node, and comparing the metric value with a predetermined value to determine whether the global constraint 250 would be satisfied by including an edge to the node. Generally, any global constraint may be represented using one or more metrics, and the graph 211 can be constructed using the calculated metric values. However, some global constraints make the graph 211 so large that the k-shortest paths algorithm can no longer operate efficiently. Other global constraints result in smaller graphs that allow the K-shortest paths to be more efficiently determined. The auction system 130 may include a constraint evaluator 280 for determining the complexity of determining the K-best solutions 180. The complexity is the complexity of the solution method for determining the K-best solutions 180. Complexity may be a function of the time a solution method takes to compute the k-shortest paths, which may be relative to the size of the graph. Applying different global constraints may result in different solution method complexities for computing the K-shortest paths. If an estimation of the time it will take to calculate K-best solutions when a particular global constraint is applied is too large, a user may opt for a different global constraint.

According to an embodiment, the Big Oh may be used to characterize an upper bound of a running time of a function, such as the worst-case or maximum running time for any input to the function. Thus, the maximum running time of the function is in the order of Big Oh. In one example, the global constraint is based on the number of sellers, and $O(S^N)$ represents an upper bound on the time it takes to calculate the K-best solutions, where a complexity factor $f=S^N$. O is the Big Oh; S is the number of sellers supplying the bids 120; and N is the constraint on the number of sellers, such as an upper bound on the number of sellers, lower bound on the number of sellers or exact number of sellers for each solution. In particular, the complexity of a solution method for determining the K-best solutions for an unconstrained graph, which is a graph of the relaxed solutions, is $O(IR(S,Q)+KI)$. I is the number of items. $R(S,Q)$ is the number of ways in which exactly Q quantiles can be supplied by S sellers and can be calculated using Equation 1 above. K is the number of solutions to be determined, i.e., K-best solutions. The complexity of a solution method for determining the K-best solutions for a constrained graph, such as the graph 211, is $O(IR(S,Q)S^N+KI)$. Generally, given a complexity factor f, it means that determining the K-best solutions takes an amount of time represented by $O(IR(S,Q)f+KI)$.

In another example, given a range over all subsets of a set C of sellers, the complexity of a solution method for determining K-best solutions when applying a global constraint in the form of "seller S1 is assigned non-zero shares for item X", where S1 is a member of C, can be calculated. For example, the global constraint "if S1 is assigned a share in some item, or one or the other but not both of S2 and S3 must be assigned a share in some other item" can be evaluated using the following complexity factor $f=2^{(size\ of\ C)}$ and $O(2^{(size\ of\ C)})$ represents an upper bound on the time it takes to calculate the K-best solutions. Given this complexity factor, an estimation of the time it takes to determine the K-best solutions from a graph of all the solutions satisfying the global constraint can be calculated.

In another example, the complexity factor $f=Q^n$, may be used to estimate the time it takes to determine the K-best solutions when applying a global constraint on the number of quantiles Q that can be supplied by a seller and n is the number of sellers involved in the constraint. The upper bound on the time it takes to determine the K-best solutions is $O(Q^n)$. An example of a global constraint on the number of quantiles Q that can be supplied by a seller is "the total quantity assigned to S2 must be no more than 10 times the total quantity assigned to S1".

In another example, for constraints involving upper or lower bounds on metrics that are either continuous or have too many discrete values for the bound $O(Q^n)$ to be useful, quantization is possible. An example of such a metric is the total monetary value of all assignments to a given seller. For example, an approximate metric value is chosen from a limited set $\{M1, M2, \ldots, MQ\}$ for each node. False positives due to rounding errors, which are solutions that violate the constraint but are included in the graph 211, may be filtered by appropriately selecting a higher or lower quantization value or providing finer-grained quantization. These examples may be used to estimate the length of time to determine the K-best solutions when applying different global constraints. Based on the estimation, a decision-maker may decide whether to apply a particular global constraint.

Figure 3A:
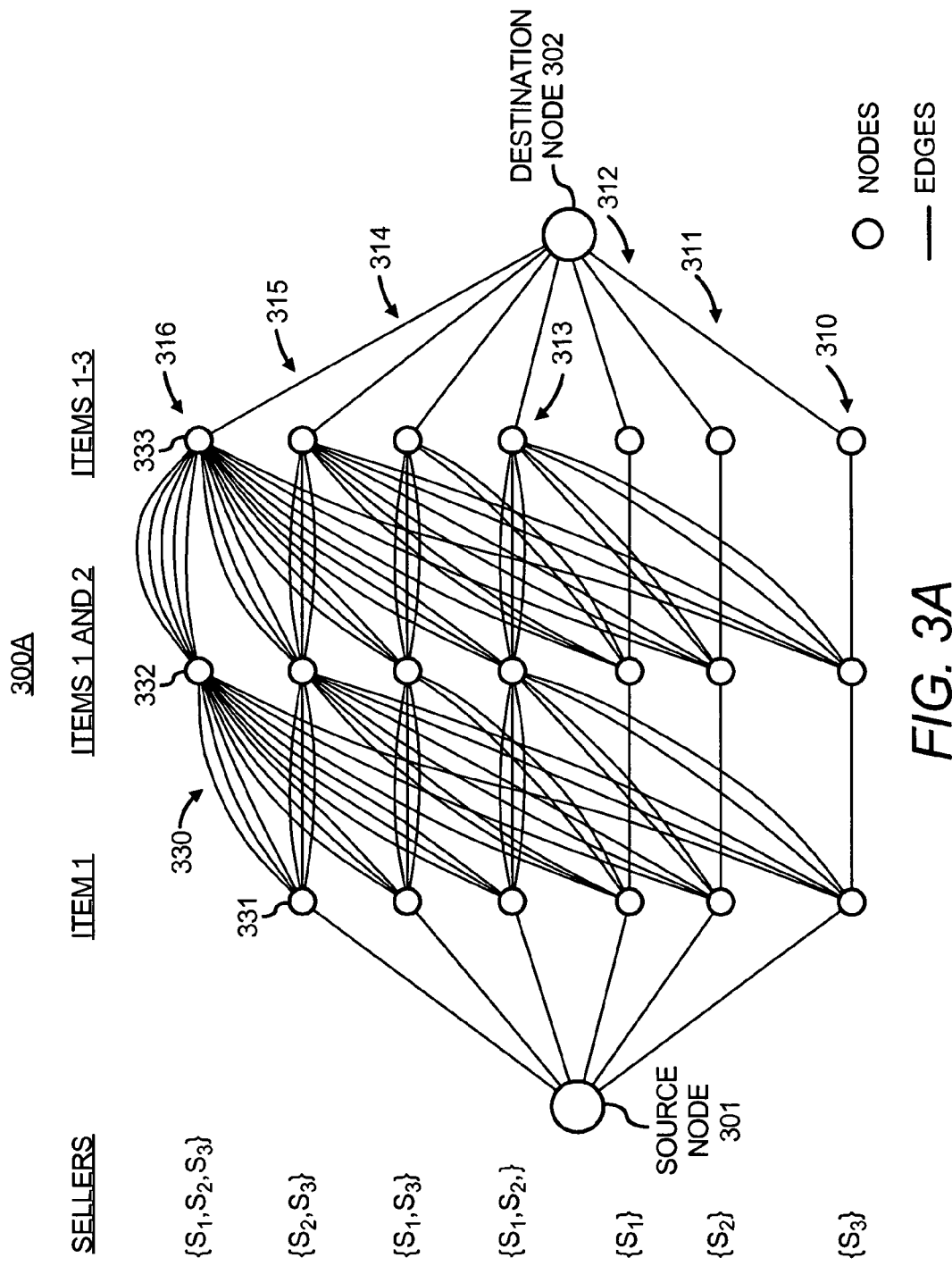

FIGS. 3A-D illustrate examples of the graph 211 described with respect to FIG. 2 that may be generated by the graph generator 210 shown in FIG. 2. The examples of the graph 211 shown in FIGS. 3A-D include edges that are directed and run left to right. FIG. 3A illustrates a graph 300A of relaxed solutions where there are no global constraints. Each path comprised of edges and nodes from the source node 301 to the destination node 302 represents a solution to a multi-item procurement auction winner determination problem. In this example, there are three sellers S1-S3 providing 2 quantiles for three items 1-3. The bottom row 310 of the graph 300A represents a solution where only the seller S3 provides the items 1-3. Similarly, the row 311 represents a solution where only the seller S2 provides the items 1-3 and so on, where the sellers on the left side provide the items for the items 1-3 as shown.

The graph includes edges that extend vertically as well as horizontally. For example, the edges 330 extending from the node 331 to the node 332 indicate that at node 331 only sellers S1 and S2 provide quantiles for item 1, and at the node 332 all three sellers S1-S3 provide quantiles for items 1 and 2. Each edge of the edges 330 represent different quantiles that may be provided by the sellers S1 and S2 for the items 1 and 2 as specified by different solutions in the assignment list 202. Each complete end-to-end path between the source node 301 and the destination node 302 represents a complete solution for all the items 1-3.

Note that if a metric value for number of sellers is calculated for each node, the metric value for the nodes in the rows 310-312 is 1. Also, the metric value for the nodes in the rows 314-315 is 2, and the metric value for the nodes in the row 316 is 3. Also, the metric value is calculated, for example, by maintaining an unordered list of sellers that are used so far as you move along in a path, wherein each seller in the list is different. For example, at node 331 the unordered list includes {S2,S3}, and the metric value is calculated by summing the number of different sellers, which is 2. At node 332, the list includes {S1,S2,S3} and the metric value is 3. At node 333, the list is unchanged and the metric value is 3 at the node 333.

Figure 3B:
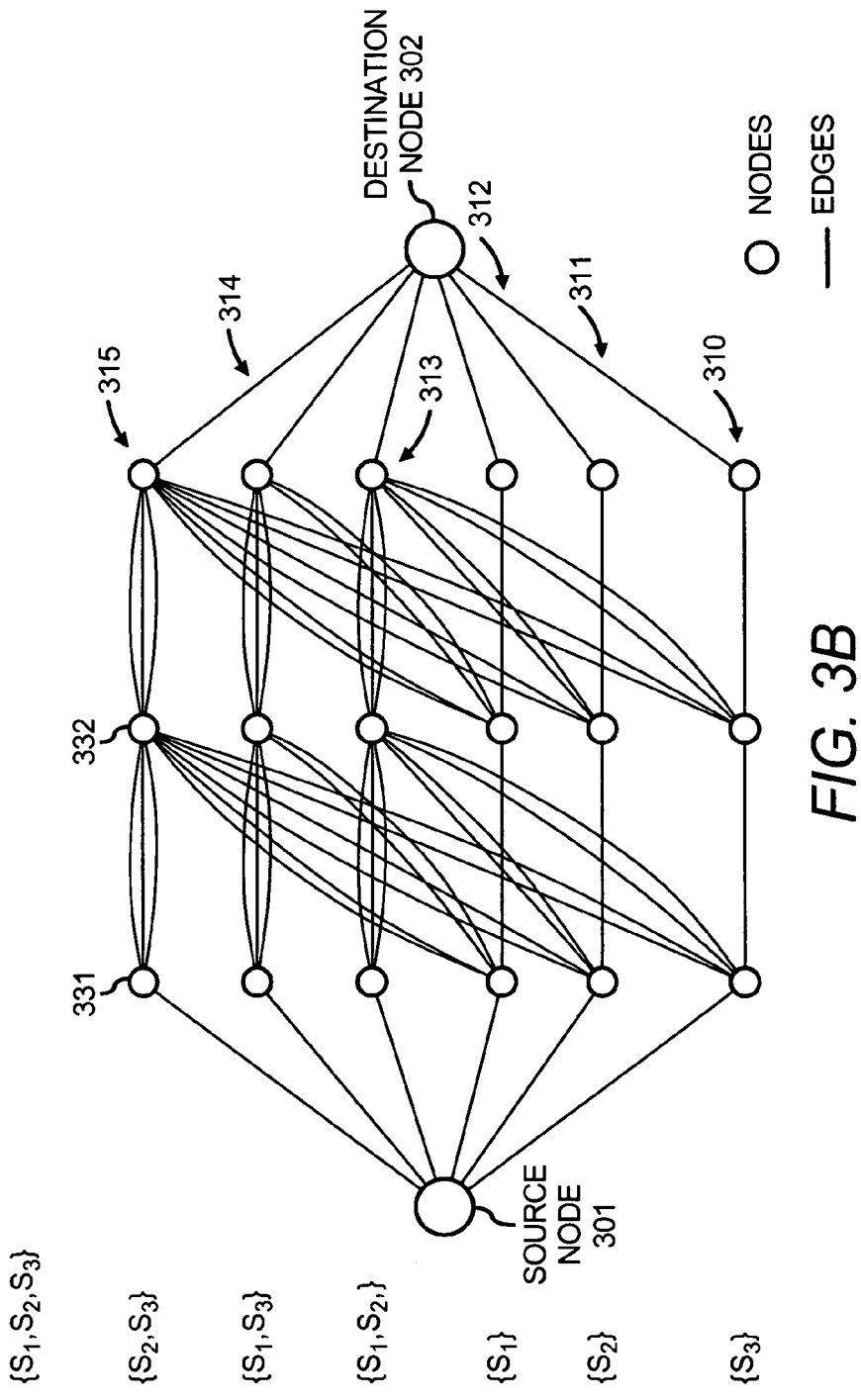

FIG. 3B illustrates a graph 300B of feasible solutions where the global constraint 250 is that no more than two sellers can be used to supply items 1-3. As shown in the graph 300B, the graph generator 210 does not include paths in the graph 300B that include more than two sellers. Thus, paths and edges including any of the nodes in the top row shown in FIG. 3A are not included in the graph 300B shown in FIG. 3B because these nodes include three sellers. In other words, the predetermined metric value is 2, and the nodes in the top row shown in FIG. 3A have a metric value of 3 that exceeds the predetermined value. The metric value for each node is calculated, and a comparison to the predetermined value is performed at each node for each path to determine whether a path is included in the K-best solutions 180.

Figure 3C:
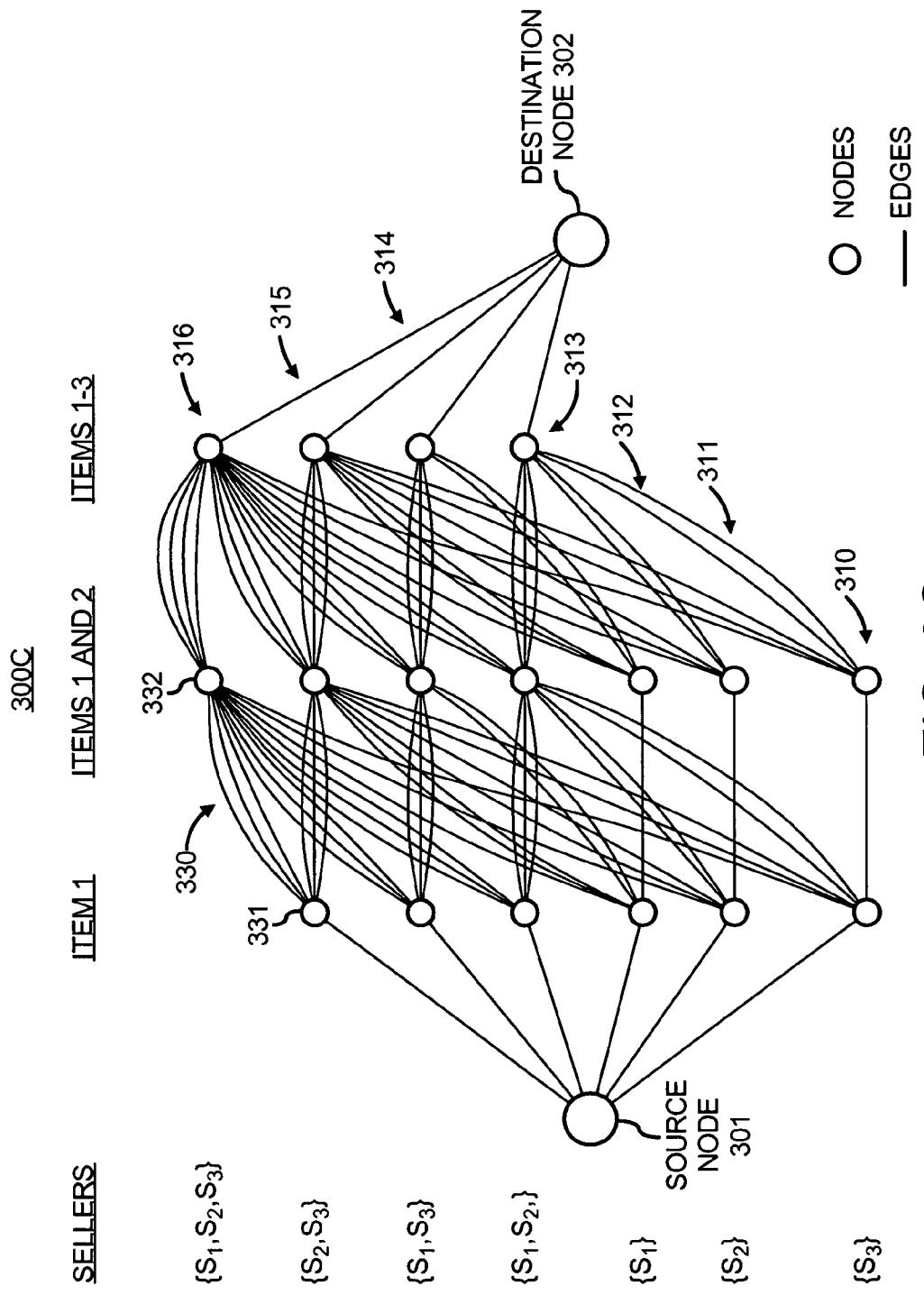

FIG. 3C illustrates a graph 300C of feasible solutions where the global constraint 250 is that no less than two sellers can be used to supply items 1-3. As shown in the graph 300C, the graph generator 210 does not include paths in the graph 300B that include only 1 seller. The metric value for each node is calculated, and a comparison to the predetermined value, which is 1 in this example, is performed at each node for each path to determine whether a path is included in the K-best solutions 180.

FIG. 3D illustrates a graph 300D of feasible solutions where the global constraint 250 is that only two sellers can be used to supply items 1-3. As shown in the graph 300D, the graph generator 210 does not include paths in the graph 300B that include only 1 seller or only 3 sellers. The metric value for each node is calculated, and a comparison to the predetermined value, which is 2 in this example, is performed at each node for each path to determine whether a path is included in the K-best solutions 180.

Figure 4:
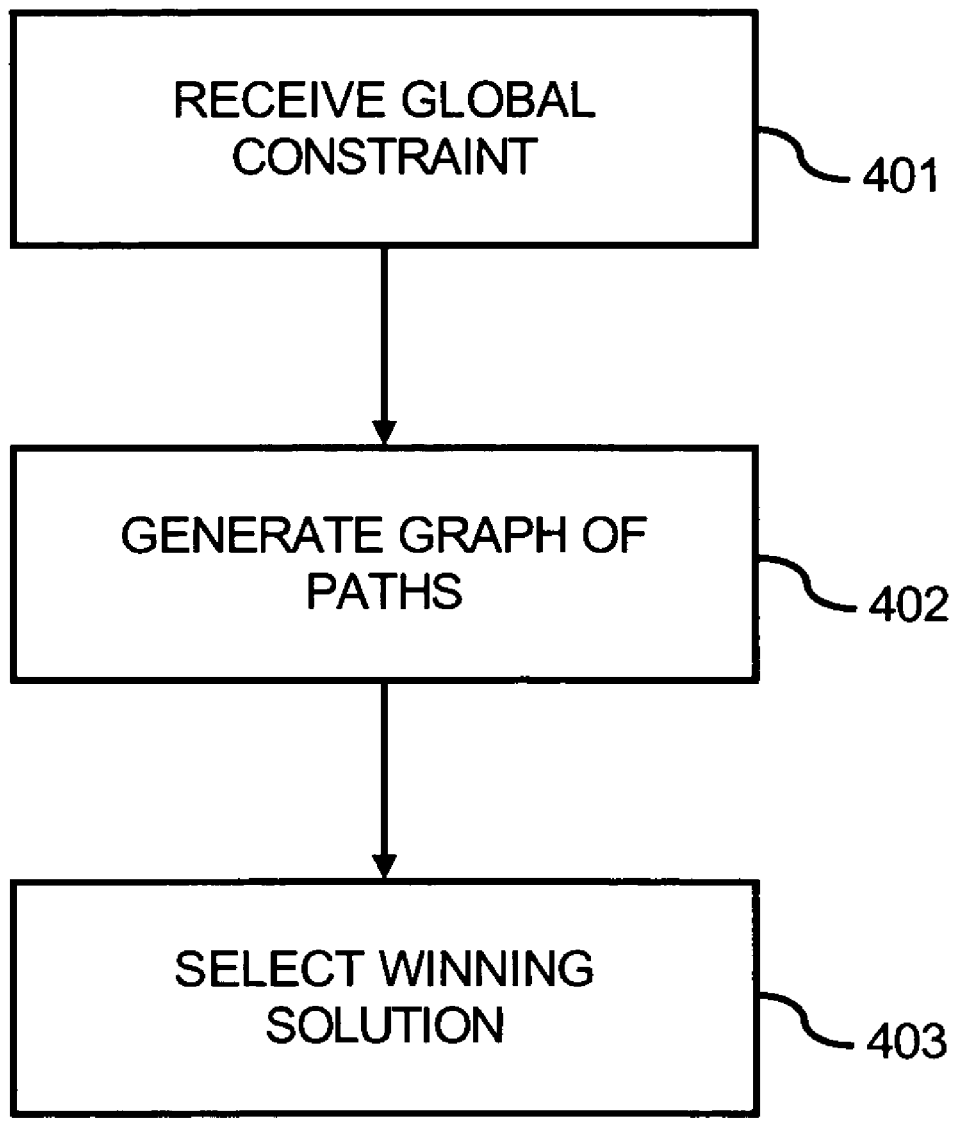
FIG. 4 shows a method for selecting a winning solution, according to an embodiment.

FIG. 4 depicts a flowchart 400 for computing a set of solutions satisfying a constraint for an auction winner-determination problem. FIG. 4 is described with respect to one or more of FIGS. 1-2 by way of example and not limitation, and the steps of the method 400 may be performed by systems other than shown in FIGS. 1 and 2.

At step 401, the auction system 130 receives the global constraint 250 shown in FIG. 2. At step 402, the auction system 130 generates a graph of paths, wherein each path represents a solution to the auction winner-determination problem that satisfies the constraint. For example, the graph generator generates the graph 211, which may only include solutions that satisfy the global constraint 250. At step 403, a winning solution from the graph 211 is selected. For example, the objective function module 220 determines the optimal solutions 271 that best satisfy the objective function 240. The optimal solutions 271, for example, include the K-cheapest solutions. The objective function module 220 may order the K-cheapest solutions by cost, and the cheapest solution or one of the cheapest solutions is selected as the winning solution.

Figure 5:
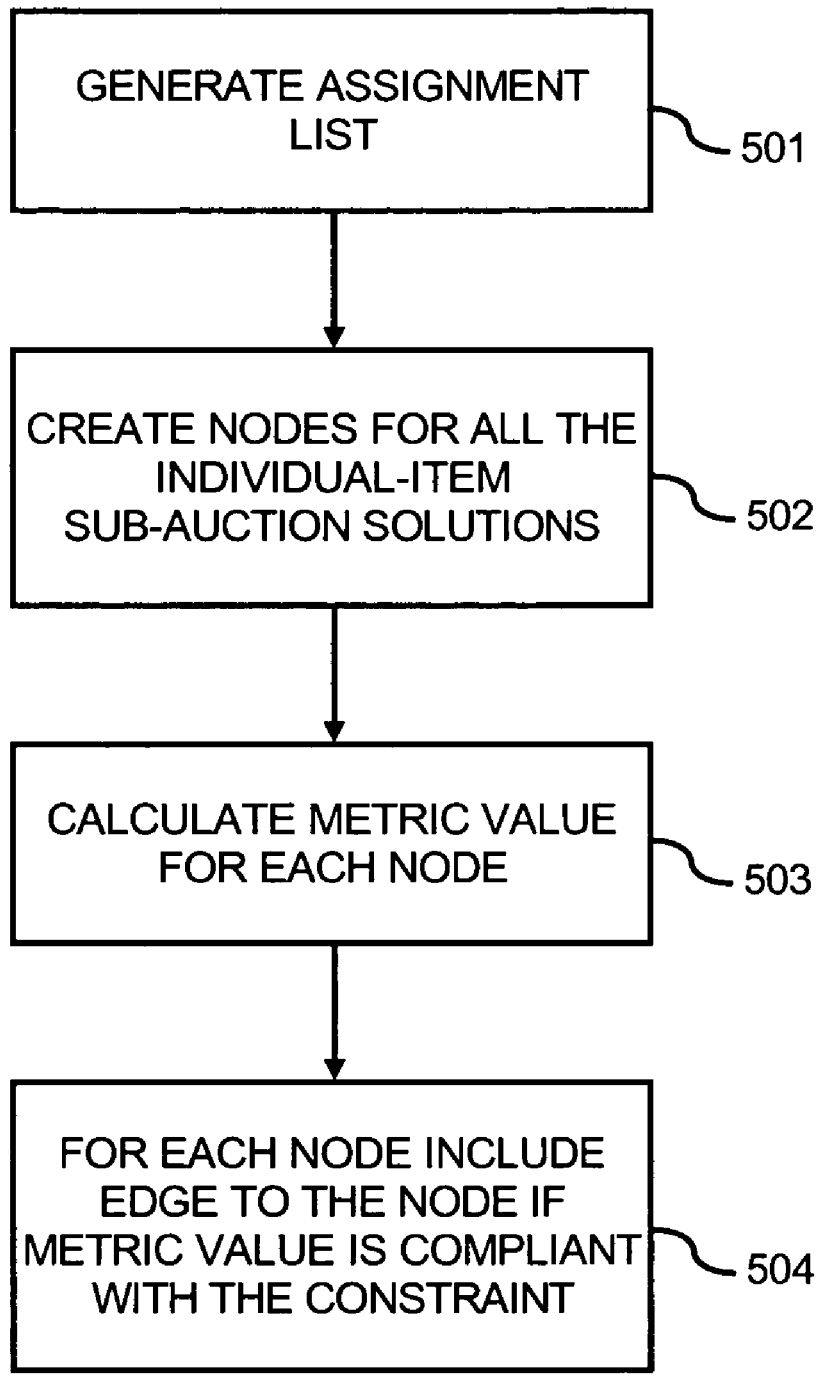
FIG. 5 shows a method for generating a graph depicting solutions to an auction winner determination problem, according to an embodiment.

FIG. 5 illustrates a method 500 for generating a graph including solutions that satisfy a constraint for a multi-item procurement auction winner determination problem. FIG. 5 is described with respect to one or more of FIGS. 1-2 by way of example and not limitation, and the steps of the method 500 may be performed by systems other than shown in FIGS. 1 and 2. Furthermore, the steps of the method 500 may be sub-steps of the step 402 for generating a graph of paths. The graph may be a directed graph and in particular may include a directed acyclic graph.

At step 501, an assignment list is generated that includes all individual-item sub-auction solutions for each item in the multi-item procurement auction. For example, the assignment list generator 201 shown in FIG. 2 generates the assignment list 202.

At step 502, nodes in a graph are created for all the individual-item sub-auction solutions. For example, referring to FIG. 3A, the node 331 in the graph 300A represents sub-auction solutions for item 1 that include quantiles from sellers S2 and S3. The edges 330 to the node 332 represent all the sub-auction solutions for items 1 and 2, and so on with respect to the other nodes and edges.

At step 503, a metric value is calculated for each node. One example of a metric is number of sellers. For example, the global constraint 250 is that no more than 2 different sellers may be used to supply all the needed items in a multi-item procurement auction. The graph generator 210 calculates a metric value of number of sellers for each node. The metric value may be incremented, decremented or left the same at each node, depending on the number of different sellers for each node. For example, referring to FIG. 3A, the node 331 in the graph 300A sub-auction solutions for item 1 that include quantiles from sellers S2 and S3. The calculated metric value is 2, because 2 sellers are used for the sub-auction solutions for item 1. The node 332 represents sub-auction solutions for items 1 and 2 that include quantiles from sellers S1-S3. The calculated metric value is 3 for the node 332, because 3 sellers are used for the sub-auction solutions for item 1.

At step 504, for each node, an edge is included to the node if the metric value is compliant with the constraint. For example, referring to FIG. 3B illustrating the graph 300B of K-best solutions where the global constraint 250 is that no more than two sellers can be used to supply items 1-3, the graph generator 210 does not include paths in the graph 300B that include more than two sellers. For example, at each node in the graph 300A shown in FIG. 3A, the graph generator 210 compares the metric value for the node to a predetermined value, which is 2 in this example because the global constraint 250 is that no more than two sellers can be used to supply items 1-3. Thus, paths including any of the nodes and edges in the top row 316 shown in FIG. 3A are not included in the graph 300B shown in FIG. 3B because these nodes include three sellers, which is not compliant with the 2-seller maximum. In other words, the nodes in the top row 316 shown in FIG. 3A have a metric value of 3 that exceeds the predetermined value. Thus, edges are not included to the nodes in the top row 316, shown in FIG. 3A, in the graph 300B shown in FIG. 3B because these edges represent individual-item sub-auction solutions that violate the global constraint.

Paths between the source node 301 and the destination node 302 shown in FIGS. 3A-D are created by calculating the metric value for each node and performing the evaluation using the metric value to determine whether to include an edge to the node. The edges, which represent individual-item sub-auction solutions that satisfy the global constraint, form the paths between the source node 301 and the destination node 302. Each path represents a feasible solution to a multi-item auction procurement problem that satisfies the global constraint. Thus, the global constraint is not just satisfied for an individual-item sub-auction solution. The global constraint is satisfied for a path representing all the individual-item sub-auction solutions for an auction WDP.

Figure 6:
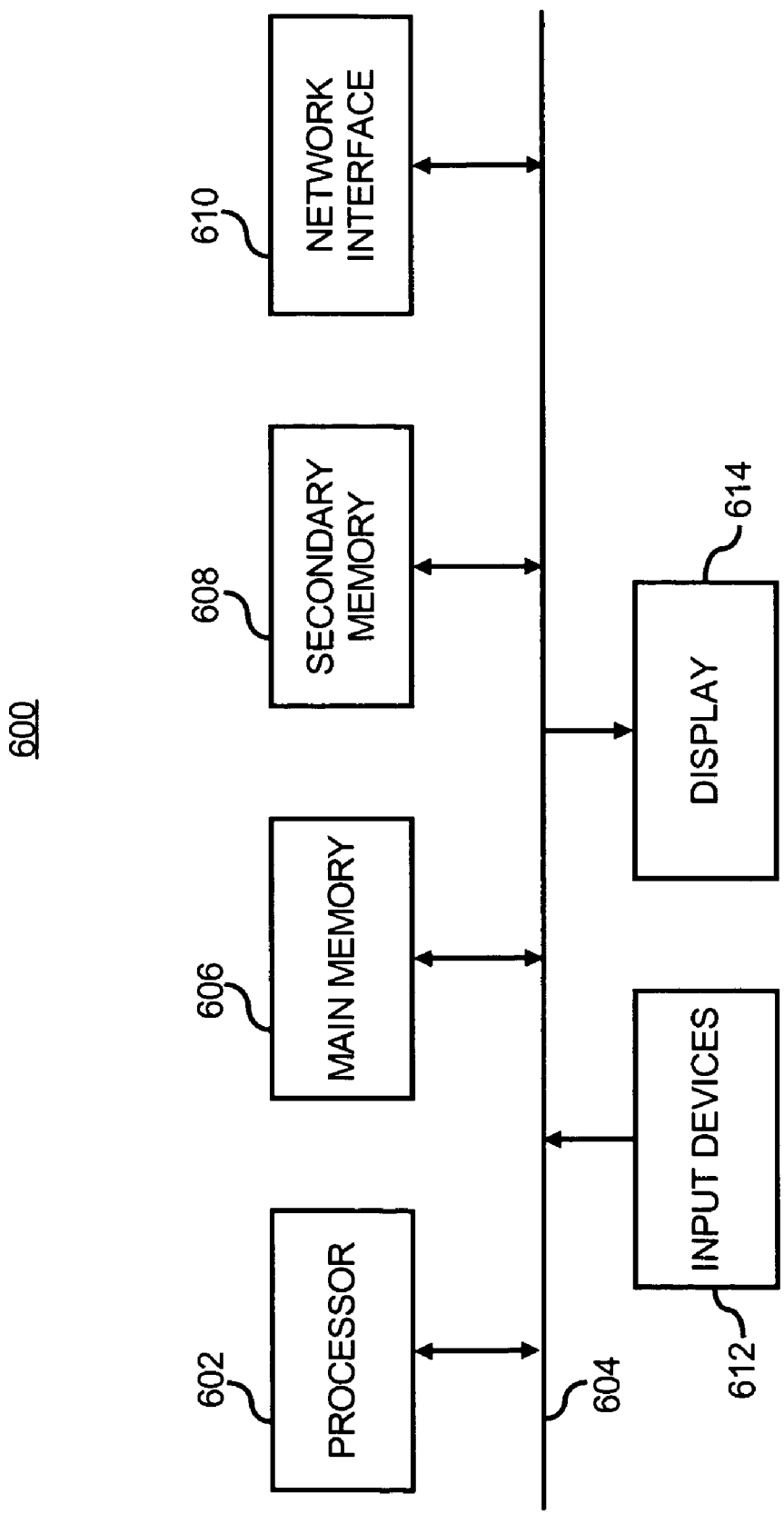
FIG. 6 shows a computer system operable to used as a platform for implementing one or more of the embodiments, according to an embodiment.

FIG. 6 illustrates a block diagram of a general purpose computer system 600 that is operable to be used as a platform for the auction system 130 shown in FIGS. 1 and 2. It will be apparent to one of ordinary skill in the art that a more sophisticated computer system is operable to be used. Furthermore, components can be added or removed from the computer system 600 to provide the desired functionality.

The computer system 600 includes one or more processors, such as processor 602, providing an execution platform for executing software. Commands and data from the processor 602 are communicated over a communication bus 604. The computer system 600 also includes a main memory 606, such as a Random Access Memory (RAM), where software is resident during runtime, and a secondary memory 608. The secondary memory 608 includes, for example, a hard disk drive and/or a removable storage drive representing a floppy diskette drive, a magnetic tape drive, a compact disk drive, etc., or a nonvolatile memory where a copy of the software is stored. In one example, the secondary memory 608 also includes ROM (read only memory), EPROM (erasable, programmable ROM), EEPROM (electrically erasable, programmable ROM). The computer system 600 includes a display 614 and user interfaces comprising one or more input devices 612, such as a keyboard, a mouse, a stylus, and the like. However, the input devices 612 and the display 614 are optional and other shown components. A network interface 610 is provided for communicating with other computer systems.

One or more of the steps of the methods 500 and 600 and other steps described herein are operable to be implemented as software stored on a computer readable medium, such as the memory 606 and/or 608, and executed on the computer system 600, for example, by the processor 602. In one embodiment, the modules shown in FIG. 2 include software stored on and executed by the computer system 600.

The steps are operable to be embodied by a computer program, which can exist in a variety of forms both active and inactive. For example, they exist as software program(s) comprised of program instructions in source code, object code, executable code or other formats for performing some of the steps. Any of the above can be embodied on a computer readable medium, which include storage devices and signals, in compressed or uncompressed form.

Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method of computing a set of solutions satisfying a constraint for an auction winner-determination problem, wherein the auction comprises a multi-item procurement auction in which sellers bid to supply shares of each item, the method comprising:
   receiving a constraint; and
   determining individual-item sub-auction solutions for each item in the auction, wherein at least one of the individual-item sub auction solutions includes multiple sellers; and
   generating, by a computer, a graph of paths from the individual-item sub auction solutions, wherein generating the graph comprises creating a node for each individual-item sub-auction solution; calculating a metric value for each node, wherein the metric value is for a metric representing the constraint; and for each node, including an edge to the node if the metric value is compliant with the constraint, and wherein each path is a solution to the procurement auction winner-determination problem that satisfies the constraint, and at least one of the paths includes a node representing the individual-item sub-auction solutions for an assignment of multiple items to the multiple sellers.

2. The method of claim 1, further comprising:
   selecting a path from the graph as a winning solution to the auction winner-determination problem.

3. The method of claim 1, wherein the paths in the graph comprise the edges and the nodes between a source node and a destination node.

4. The method of claim 1, wherein the metric is the number of sellers, number of quantiles provided by a seller, or cost of a winning solution.

5. The method of claim 1, wherein the constraint is satisfied for all the individual-item sub-auction solutions in each path in the graph.

6. The method of claim 2, further comprising:
   determining a cost for each path; and
   selecting a winning solution comprises selecting the winning solution based on the cost.

7. The method of claim 1, further comprising:
   receiving an objective function; and
   determining K-best solutions from the graph based on the objective function, where K is an integer greater than 0.

8. The method of claim 7, wherein the K-best solutions comprise a K-number of solutions that best satisfy the objective function relative to other solutions represented in the graph.

9. The method of claim 7, further comprising:
   calculating a complexity of determining K-best solutions based on the constraint, wherein the complexity is used to determine whether to apply the constraint.

10. The method of claim 7, wherein the K-best solutions comprise the K-cheapest solutions to the auction winner determination problem, the method further comprising:
    ordering the K-cheapest solutions based on cost.

11. A multi-item procurement auction system, comprising:
    a processor;
    an assignment list generator executed by the processor to determine an assignment list of solutions for an auction from bids received from at least one buyer or at least one seller engaged in the auction, wherein the assignment list comprises individual-item sub-auction solutions for each item in the auction and at least one of the individual-item sub auction solutions includes multiple sellers; and
    a graph generator operable to generate a graph of the solutions in the assignment list that satisfy at least one constraint, wherein the graph comprises a plurality of nodes between a source node and destination node, each node representing an individual item sub-auction solution and at least one of the nodes represents the individual-item sub-auction solutions for an assignment of multiple items to the multiple sellers, wherein edges connect the plurality of nodes to form paths representing the solutions that satisfy the at least one constraint.

12. The auction system of claim 11, further comprising:
    an objective function module operable to determine a set of K-best solutions from the graph that best satisfy an objective function, where K is an integer greater than 0.

13. The auction system of claim 11, wherein the auction comprises a multi-item procurement auction and the at least one seller comprises a plurality of sellers submitting the bids to supply shares of each item.

14. The auction system of claim 11, wherein the graph generator is operable to generate the graph from the individual-item sub-auction solutions, the graph including the plurality of nodes, wherein the plurality of nodes are used to represent each individual-item sub-auction solution in the graph.

15. The auction system of claim 14, wherein the graph generator is operable to calculate a metric value for each of the plurality of nodes, wherein the metric value is for a metric representing the at least one constraint, wherein for each node of the plurality of nodes, the graph generator is operable to include an edge to the node if the metric value is compliant with the at least one constraint.

16. A non-transitory computer readable medium upon which is stored a computer program including instructions which when executed by a processor cause the processor to perform a method of computing a set of solutions satisfying a constraint for an auction winner-determination problem, wherein the auction comprises a multi-item procurement auction in which sellers bid to supply shares of each item, and the determined solutions include individual-item sub auction solutions for each item in the auction and at least one of the individual-item sub auction solutions includes multiple sellers, the method comprising:

creating nodes operable to be used to represent each individual-item sub-auction solution; and calculating a metric value for each node, wherein the metric value is for a metric representing the constraint; and for each node, including an edge to the node if the metric value is compliant with the constraint; and determining solutions to the auction whiner determination problem; and generating a graph of paths from at least some of the solutions, wherein each path is a solution to the auction winner-determination problem that satisfies a constraint, and at least one of the paths includes a node representing the individual-item sub-auction solutions for an assignment of multiple items to the multiple sellers.

\* \* \* \* \*

UNITED STATES PATENT AND TRADEMARK OFFICE
CERTIFICATE OF CORRECTION

| | | |
|---|---|---|
| PATENT NO. | : 8,086,520 B2 | Page 1 of 1 |
| APPLICATION NO. | : 11/546042 | |
| DATED | : December 27, 2011 | |
| INVENTOR(S) | : Andrew Byde et al. | |

It is certified that error appears in the above-identified patent and that said Letters Patent is hereby corrected as shown below:

In column 18, line 3, in Claim 16, delete "whiner" and insert -- winner --, therefor.

Signed and Sealed this
Twenty-third Day of October, 2012

David J. Kappos
*Director of the United States Patent and Trademark Office*